Dec. 14, 1926.
A. L. WERTZ
1,610,637
COMBINED DISPENSING AND MEASURING DEVICE
Filed Nov. 24, 1924  2 Sheets-Sheet 2
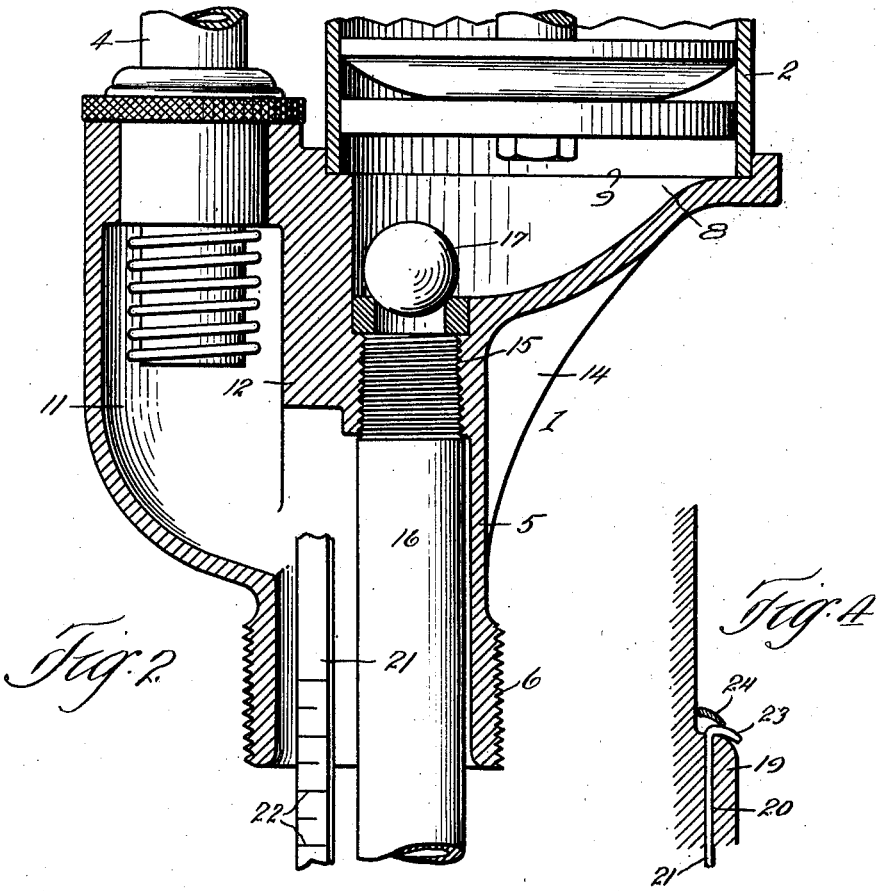
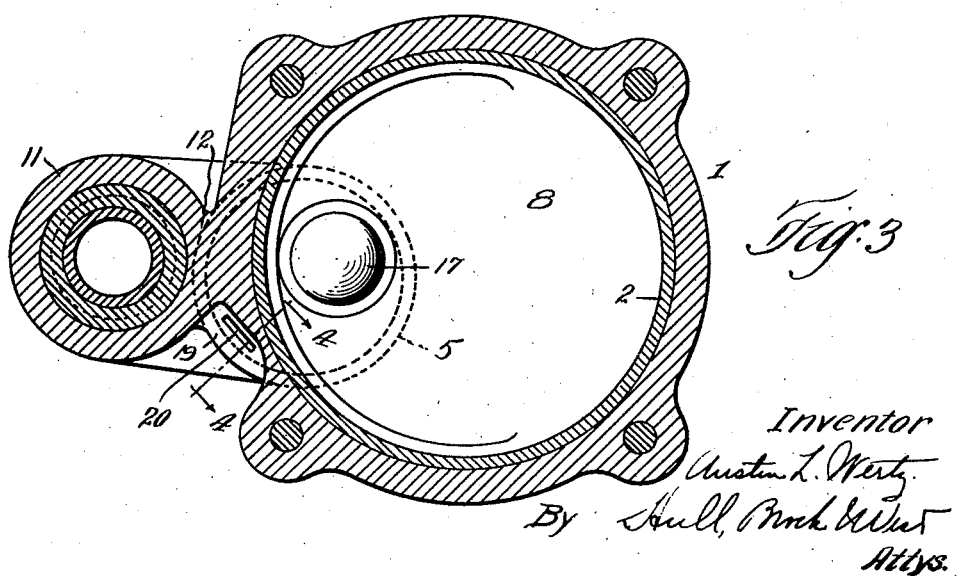
Inventor
Austin L. Wertz
By Snull, Mich & West
Attys.

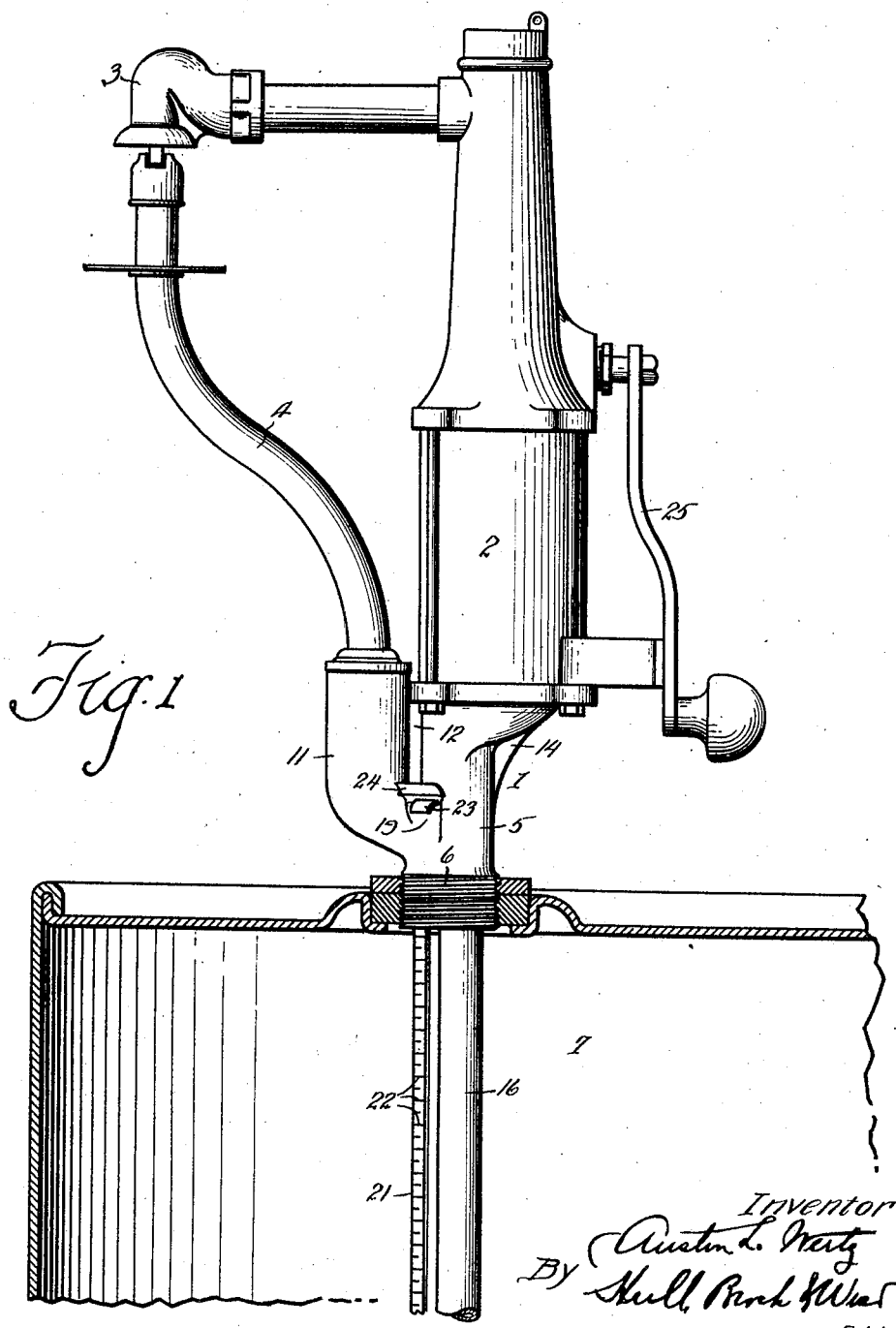

Patented Dec. 14, 1926.

1,610,637

UNITED STATES PATENT OFFICE.

AUSTIN L. WERTZ, OF LAKEWOOD, OHIO, ASSIGNOR TO VACUUM OIL COMPANY, OF NEW YORK, N. Y., A CORPORATION OF NEW YORK.

COMBINED DISPENSING AND MEASURING DEVICE.

Application filed November 24, 1924. Serial No. 751,790.

This invention relates to pumps and is directed more particularly to pumps for dispensing lubricants or other liquids from a container.

Heretofore it has been the general practice to attach the pump through the usual standard opening in the container provided for such purpose, and when it is desired to ascertain, at any time, the quantity of liquid remaining in the container it has been necessary to either remove the pump or the plug normally closing the filling opening so that a measuring stick or other device could be inserted into the container. This practice often leads to the introduction of dirt or other foreign matter into the liquid as the measuring device is a separate element. Other difficulties such as inconvenience and delay are also inherent in this practice.

It is the primary object of the present invention to provide a pump having a container measuring device incorporated therein so that the pump and measuring device may be attached as a unit to a container through the standard size aperture provided for the pump, thereby overcoming the aforementioned objections to the use of a separate container measuring device.

Another object is to provide a combined pump and container measuring device wherein the pump shall function in the usual manner and with the usual efficiency, and wherein the measuring device shall be readily accessible for determining the quantity of liquid within the container.

A still further object is to provide a device of the aforesaid character which shall be simple in construction, inexpensive to manufacture and which shall be neat in appearance.

With these and other objects in view the invention consists in the various novel features of construction and arrangement or combination, all of which will be fully described hereinafter and set forth in the appended claims.

In the drawing accompanying and forming part of this application, Fig. 1 is an elevation of a pump incorporating a measuring device therein in accordance with my invention; Fig. 2 is an enlarged vertical sectional view through the base of the pump; and Fig. 3 is a horizontal sectional view taken in a plane slightly above the seat of the pump cylinder; and Fig. 4 is a sectional view on the line 4—4 of Fig. 3.

Describing the various parts by reference characters, 1 denotes generally the base of the device, 2 the pump cylinder, 3 the discharge spout, and 4 the return drain pipe. These parts with the exception of base 1 may be of any suitable or approved construction and hence a detailed description thereof is deemed unnecessary.

The base 1 is preferably in the form of a casting having a vertically disposed and substantially cylindrical body portion 5 which is threaded at the lower end as indicated at 6 so that the device may be easily and quickly attached to the container 7 as shown in Fig. 1. The upper end of the body portion 5 merges into an enlarged cup shaped chamber 8, the peripheral edge whereof defines a seat 9 for the pump cylinder 2. In this connection it will be noted that, while the vertical axes of the body portion 5 and chamber 8 are arranged in parallel relation, the axis of chamber 8 is offset considerably from the axis of the body portion for a purpose to be referred to hereinafter. The body portion is also provided with an upwardly directed branch conduit 11 to which the return drain pipe 4 is connected. In practice I preferably form a web 12 between the branch 11 and body portion 5 and also a web 14 between the offset wall of chamber 8 and said body portion so as to strengthen the casting as a whole.

The upper end of the body portion 5 is formed with an internal screw thread 15 to receive a conduit 16 which is adapted to project into the liquid in the container. A suitable check valve 17 is located in the casting adjacent the upper end of the conduit 16.

The base is also formed with a lug 19 adjacent the point where the branch 11 joins the body portion 5.

This lug is provided with a slot 20 which opens into the body portion and permits a measuring stick 21 to be inserted therethrough and into the container. As shown in Figs. 1 and 2, the measuring stick is provided with suitable graduations 22, and the upper end thereof is turned over as indicated at 23 to support the stick on the lug 19. A cover plate 24 is hingedly connected to the casting 1 and is adapted normally to cover the slot 20 and hooked end 23 of the measuring device, so as to prevent water, dust or other foreign material entering the container.

In use, the pump is attached to the container in the usual manner, the conduit 16 and measuring device 21 depending through the usual aperture in the container. The pump is operated by means of hand crank 25 in the customary manner to dispense the liquid in the container in measured quantities. If at any time the operator desires to know the quantity of liquid remaining in the container, it is only necessary for him to lift the measuring stick or device upwardly by means of hook 23 and observe the graduation thereon between the wet and dry portions of the stick, whereupon the stick may be lowered into the container.

The offset arrangement of the pump cylinder on the base casting permits the measuring device to be raised vertically without bending said device.

It will be understood that while I have shown and described a measuring stick in connection with a pump for dispensing predetermined quantities of a liquid, I do not wish to limit myself to the use of a particular type of measuring device or to a pump for dispensing predetermined quantities of liquids except as set forth in the annexed claims.

Having thus described my invention, what I claim is:

1. The combination with a pump having a base formed with a reduced portion externally threaded and adapted to be connected to a container to dispense the contents of said container, of indicating means extending through said reduced portion for determining the quantity of liquid in said container.

2. The combination with a pump having a base having a reduced portion externally threaded and adapted to be connected to a container, said base having an aperture therein above said screw threaded portion, and an indicating element extending through said aperture and said screw threaded reduced portion and adapted to project into said container, said element being adapted to indicate the quantity of liquid in said container.

3. A pump of the character set forth comprising a base having a reduced attaching portion adapted to be connected to a container, said base having a seating portion offset from said base above said attaching portion, a pump cylinder mounted on said seating portion above said attaching portion, and means extending through said attaching portion to one side of the pump cylinder for indicating the quantity of liquid in said container.

4. A pump of the character set forth comprising a base having a reduced attaching portion adapted to be connected to a container, a cylinder connected to said base above said attaching portion and offset from said base, said base having an aperture formed therein to one side of the cylinder, and a vertically movable indicating element extending through said aperture and said reduced attaching portion and adapted to project into said container.

5. In combination with a base having a lower hollow reduced portion adapted to be connected to a container and two branches above said reduced portion, a pump connected to one of said branches of the base, a conduit extending through said reduced portion and connected with the pump, said conduit being spaced from the interior walls of said reduced portion to provide a space communicating with the other branch of the base to conduct drainings back to the container, and the base being provided with an aperture communicating with the space about the conduit, and a gage member extending through said aperture and the space of the hollow reduced portion of the base about the conduit.

In testimony whereof, I hereunto affix my signature.

AUSTIN L. WERTZ.